US010891129B1

(12) United States Patent
Antonio et al.

(10) Patent No.: US 10,891,129 B1
(45) Date of Patent: Jan. 12, 2021

(54) DECENTRALIZED DEVELOPMENT OPERATIONS BLOCKCHAIN SYSTEM

(71) Applicant: Accenture Global Solutions Limited, Dublin (IE)

(72) Inventors: Emmanuel Benbinuto Antonio, Mandaluyong (PH); Darwin Endaya Flores, Pampanga (PH); Yvonne Jean Balsamo Martinez, Dumaguete (PH)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/555,266

(22) Filed: Aug. 29, 2019

(51) Int. Cl.
*G06F 9/44* (2018.01)
*G06F 8/77* (2018.01)
*G06F 40/40* (2020.01)

(52) U.S. Cl.
CPC ............... *G06F 8/77* (2013.01); *G06F 40/40* (2020.01)

(58) Field of Classification Search
CPC ........................................................ G06F 8/77
USPC ........................................................ 717/101
See application file for complete search history.

(56) References Cited

U.S. PATENT DOCUMENTS

| | | | | |
|---|---|---|---|---|
| 9,052,961 | B2* | 6/2015 | Mangtani | G06F 9/5077 |
| 10,120,668 | B2* | 11/2018 | Palavalli | G06F 9/44578 |
| 10,332,073 | B2* | 6/2019 | Abebe | G06Q 50/01 |
| 10,360,132 | B2 | 7/2019 | Bhole et al. | |
| 10,489,278 | B2* | 11/2019 | Saleh-Esa | H04L 9/0637 |
| 10,503,479 | B2* | 12/2019 | Brealey | G06F 8/10 |
| 10,606,565 | B2* | 3/2020 | Douglas | H04L 41/22 |
| 2013/0097583 | A1* | 4/2013 | Kung | G06F 8/24 717/105 |
| 2013/0297695 | A1* | 11/2013 | Satyanarayanan | H04L 65/403 709/204 |
| 2014/0282355 | A1* | 9/2014 | Berry | G06F 8/70 717/101 |
| 2018/0032322 | A1* | 2/2018 | Jagannath | G06F 8/60 |
| 2018/0217818 | A1* | 8/2018 | Douglas | H04L 41/20 |
| 2019/0028336 | A1 | 1/2019 | Coronado et al. | |
| 2019/0108482 | A1* | 4/2019 | Vikas | G06Q 10/0838 |

(Continued)

OTHER PUBLICATIONS

Juncal Alonso et al. "Decide: An Extended DevOps Framework for Multi-cloud Applications"; ICCBDC 2019, Aug. 28-30, 2019, Oxford, United Kingdom.*

(Continued)

*Primary Examiner* — Francisco J Aponte
(74) *Attorney, Agent, or Firm* — Brinks Gilson & Lione

(57) ABSTRACT

A participant node of a distributed ledger network may detect a tool event token stored on a blockchain. The tool event token may be generated by another participant node of the distributed ledger network. The tool event token may represent execution of a devops tool in a toolchain for an integrated devops environment. The participant node may generate, in response to detection of the tool event token, a new tool path. The participant node may aggregate the new tool path with a previously generated tool path. The optimization node may execute a fitness logic to generate a fitness metric based the aggregated path. The optimization node may prioritize the aggregated tool path with other unique tool paths. The optimization node may select an optimal tool path and communicate an instruction to configure the integrated devops environment with devops tools identified in the optimal tool path.

18 Claims, 6 Drawing Sheets

(56) References Cited

U.S. PATENT DOCUMENTS

| | | | |
|---|---|---|---|
| 2019/0138337 A1* | 5/2019 | Vegesna | H04L 43/08 |
| 2019/0236548 A1* | 8/2019 | Singi | G06Q 20/356 |
| 2019/0303623 A1* | 10/2019 | Reddy | G06F 11/3692 |
| 2019/0305957 A1* | 10/2019 | Reddy | H04L 63/123 |
| 2019/0354614 A1* | 11/2019 | Chui | H04L 9/3247 |
| 2019/0370160 A1 | 12/2019 | Raman et al. | |
| 2020/0012779 A1* | 1/2020 | Chandrasekaran | G06F 21/64 |
| 2020/0177478 A1* | 6/2020 | Dakshinyam | H04L 41/5096 |
| 2020/0210376 A1* | 7/2020 | Vaideeswaran | G06F 9/4837 |
| 2020/0241872 A1* | 7/2020 | Muddakkagari | G06F 8/71 |

OTHER PUBLICATIONS

Kefa Rabah; "Convergence of AI, IoT, Big Data and Blockchain: A Review"; Enhancing Global Innovation Agenda—Mara Research Journals; the Lake Institute Journal vol. 1, No. 1, Mar. 2018, pp. 1-18.*

* cited by examiner

DECENTRALIZED DEVELOPMENT OPERATIONS BLOCKCHAIN SYSTEM

TECHNICAL FIELD

This disclosure relates to devops toolchains and blockchains, and, in particular, blockchain integration of devops toolchains.

BACKGROUND

Rapid advances and the rise in popularity of development operations (devops) for technology-based systems has resulted in large numbers of market-available devops tools to automate and refine devops processes. The performance, cost, and other attributes of devops tools frequently change in response to new and disruptive standards, best practices, and technologies. As technological standards evolve, an organization may seek to switch devops tools in order to improve efficiency, quality, and/or other workflow criteria. Existing approaches to devops tool selection are largely based on siloed technical expertise and subjective opinions on the merits of one tool vs another. Moreover, migrating to new devops tools may require substantial effort and/or impose system downtime due to the inefficiencies with present approaches.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
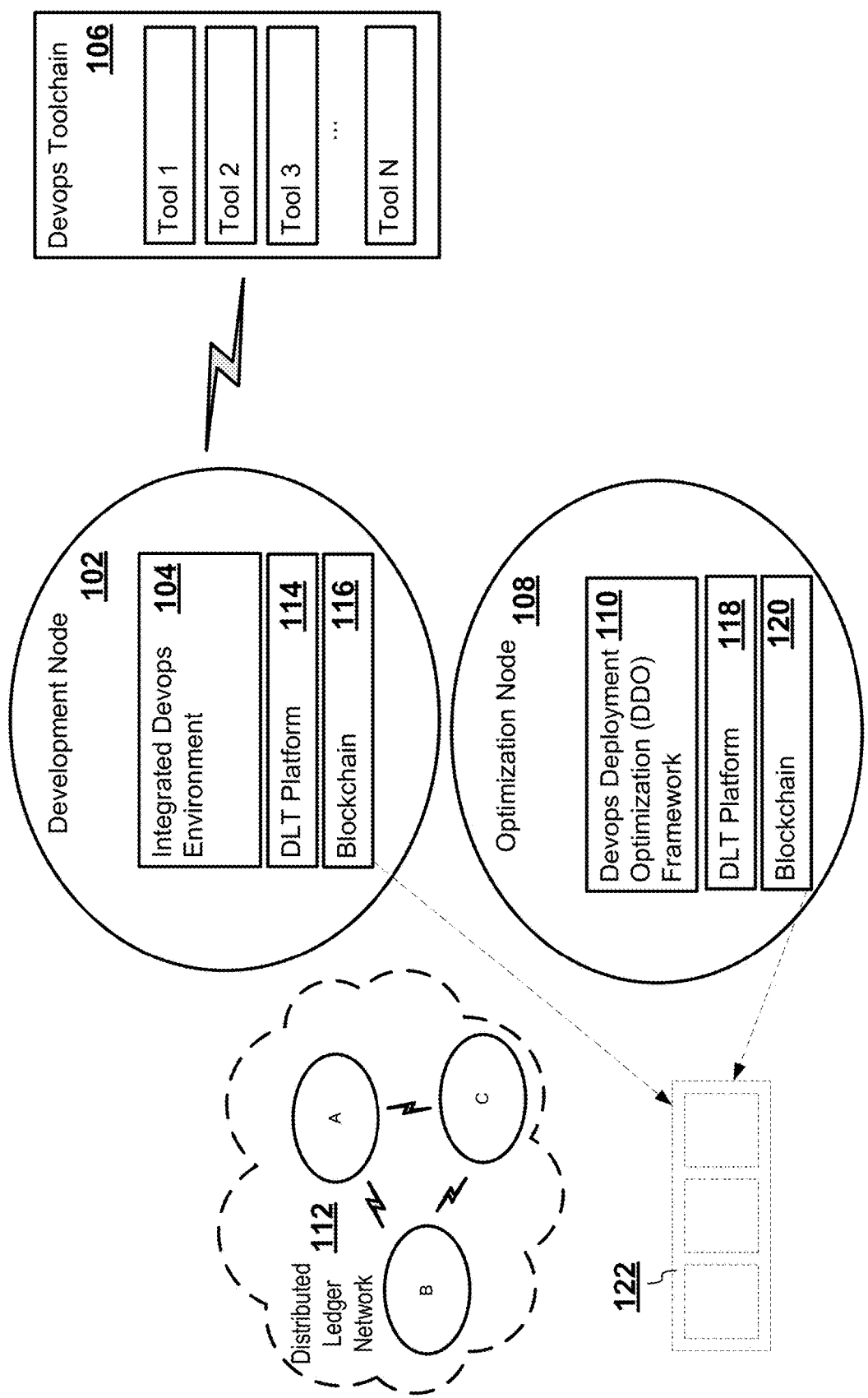
FIG. 1 illustrates a first example of a system.

Development operations (devops) is a set of practices that automates and/or augments software product development and/or information technology operations. For example, devops may include workflows for building, deploying, and maintaining software and/or hardware system(s). Numerous devops tools are available on the market to assist with implementing and performing development operations. The devops tools available on the market, and their relative performance, cost, and other attributes, frequently change in response to new and disruptive standards, best practices, and technologies. For example, some devops tools may underperform relative to others. Alternatively or in addition, new and disruptive tools may become available while other tools may become outdated or unsatisfactory. Moreover, some combinations of tools operate more efficiently than other combinations.

Organizations may generate toolchains to automate devops processes. A devops toolchain may include a selected configuration and allocation of devops tools to implement various stages of devops. The devops tools in the toolchain may be executed in a sequence based on the devops workflows of an organization. The input to a subsequent devops tool in the toolchain may be derived from (or include) an output from a preceding devops tool in the toolchain.

The wide variety of devops tools and lack of standard reporting and configuration management has resulted a fragmented market where devops tools are selected based on the subjective standards and opinions. Thus, devops toolchains, and products generated by the devops toolchains, often suffer from inefficiencies, errors, and other disadvantages.

Accordingly, systems and methods for toolchain optimization are provided. By way of introductory example, a system may detect, by an optimization node of a distributed ledger network, a tool event token stored on a blockchain. The tool event token may be generated by a development node of the distributed ledger network. The tool event token may represent of execution of a devops tool in a toolchain for an integrated devops environment. The optimization node may generate, in response to detection of the tool event token, a new tool path. The new tool path may include a starting tool identifier, an ending tool identifier, and an execution time duration. The starting tool identifier may correspond to a preceding devops tool in a toolchain. The ending tool identifier may correspond to a subsequent devops tool in the toolchain. The execution time duration may represent an execution time of the preceding tool devops or the subsequent devops tool.

The optimization node may aggregate the new tool path with a previously generated tool path. For example, the optimization node may identify a sequence of tool paths based on respective starting tool identifiers and respective ending tool identifiers of the tool paths. The optimization node may determine a total execution time based on a combination of the respective execution time durations of the sequence of tool paths. The optimization node may generate an aggregated tool path comprising the total execution time. The optimization node may store the aggregated tool path in a repository.

The optimization node may execute a fitness logic to generate a fitness metric based the aggregated path. The optimization node may store, in the repository, a mapping between the fitness metric and the aggregated tool path. The optimization node may access a plurality of unique tool paths from the repository that are mapped to respective fitness metrics previously generated based on the fitness logic. The optimization node may prioritize the unique tool paths based on the respective fitness metrics. The optimization node may select an optimal tool path based on the prioritized unique tool paths. The optimization node may communicate a devops deployment instruction to the integrated devops environment. The devops deployment instruction may include an instruction to configure the integrated devops environment to communicate with devops tools identified in the optimal tool path.

Examples of technical advancement achieved by the systems and methods described herein include a standardized application-programming interface and protocol for devops tool optimization across multiple devops tools and enterprise resource planning (ERP) systems. The systems and methods described herein may simplify and streamline devops tool integration while reducing conversion efforts for changing tools. For example, as described herein, the optimization node may provide a standardized reporting protocol that leverages distributed ledger technology to govern participation and verification of devops tool performance across multiple systems and use cases. The standardized information collected across multiple systems and use cases may provide a basis for generating instructions for deploying optimized toolchain configurations.

Another example of a technical advancement achieved by the system and methods described herein is the decentralization and objective optimization of toolchains. For example, an optimization node may generate toolchain optimization instructions based on organization specific requirements and performance information collected across numerous of toolchain configurations. Thus, unlike traditional approaches to devops management, where devops tools are selected based on subjective experiences with a limited set of devops tools, the systems and methods described herein provide a verifiable set of performance information based on a vast source of historical toolchain information. The performance information is redundant and validated across multiple participant nodes of a distributed ledger network, thus removing the risk of failure by a central authority. As more and more participants join the distributed ledger network and report toolchain performance information, toolchain optimization may continue to benefit from new performance data based on new or upgraded toolchains. Accordingly, the systems and methods describe herein provide improved performance of automated toolchain management, toolchain operation, and, ultimately, products managed under the optimized toolchains.

Additional or alternative technical advancements are made evident by the systems and methods described herein.

FIG. 1 illustrates a first example of a system 100. The system may include a development node 102. The development node 102 may include an integrated devops environment 104. The integrated devops environment 104 may communicate with devops tools to configure, manage, and utilize one or more devops tools in a devops toolchain 106. A devops tool may include an on-premises and/or cloud-based computer implemented service that that automates development operations. For example, a devops tool may include a system to plan, create, verify, package, release, configure, and/or monitor development artifacts such as functional requirements, source code, builds, automated tests, and other artifacts according to devops practices. Table 1 provides various types and examples of devops tools.

TABLE 1

Devops Tools

| Devops Category | Examples |
| --- | --- |
| DevOps Orchestrator | JENKINS, SAP, SOLUTION MANAGER |
| User Requirements and Stories | JIRA, SERVICE NOW, CONFLUENCE |
| Object Version Management | GITHUB, SAP CHARM, BITBUCKET |
| Code Quality & Security | VIRTUAL FORGE, SONARQUBE, FORTIFY |
| Testing | WORKSOFT, SELENIUM, TOSCA |

A devops tool may be executed to perform an action in a devops workflow. For example, the integrated devops environment 104 may communicate with a devops tool to cause the devops to execute logic that provides an output based on and input provided to the devops tool. Execution of the devops tool may occur in response to a procedural call, a message, or any other type of invoking communication with the devops tool.

The devops toolchain 106 may include a selected configuration of tools to implement development operations. Devops tools may be executed in a sequence based on the devops workflows of an organization. The input to a subsequent devops tool in the toolchain 106 may be derived from (or include) an output from a preceding devops tool in the toolchain 106.

The integrated devops environment 104 may include logic to leverage distributed ledger technology. The distributed ledger technology may provide a decentralized platform by which the development node 102, and other development nodes, may report toolchain analytics and performance information. Since each devops tool and toolchain may generate unique information, the blockchain may provide a standardized reporting interface and a source of rich tool information across multiple deployments. Moreover, a lack of central authority means that failures and lapses in information are minimized. Refer to the discussion related to FIG. 2 for additional information and examples regarding the development node 102.

The system many further include an optimization node 108. The optimization node 108 may include a devops deployment optimization (DDO) framework 110. The DDO framework 110 may aggregate information related to toolchain operation and performance. The DDO framework 110 may analyze the information to determine optimized devops toolchains. In some examples, the optimization node 108 may generate configuration instructions to optimize one or more devops toolchains. For example, the optimization node 108 may generate deployment instructions for one or more development nodes. Refer to the discussion related to FIG. 3 for additional information and examples regarding the development node 102.

The development node 102 and optimization node 108 may be participant nodes of a distributed ledger network 112. The development node 102, the optimization node 108, and/or other participant nodes may include a local instance of a DLT platform and a local instance of a blockchain. For example, as illustrated in FIG. 1, the development node 102 may include a local DLT platform 114 and a local blockchain 116. The optimization node 108 may include a local DLT platform 118 and a local blockchain 120.

The distributed ledger network 112 may include participant nodes that respectively communicate based on a consensus protocol to access and submit information stored on blockchains of a distributed ledger. For example, each of the participant nodes may include a full or partial copy of a distributed ledger 122, locally stored as a blockchain. The local blockchain 116 of the development node 102 may be a replication or partial replication of the local blockchain 120 of the optimization node 108 (and vice versa).

The participant nodes, such as the development node 102 and/or the optimization node 108, of the distributed ledger network 112 may submit transactions to local instances of a DLT platform, such as the local DLT platform 106 of the development node 102 and the local DLT platform of the optimization node 108. The local DLT platforms 114, 118 may be the same type of DLT platform (i.e. ETHERIUM or some other suitable DLT type). Alternatively or in addition, the local DLT platforms 114, 118 may each implement the same consensus protocol to determine whether to append the transaction to the distributed ledger (i.e. the local blockchains of the participant nodes). The consensus protocol, as implemented by one or more of the participants of the DLT network 112, may prevent modification to previously appended or existing information in the distributed ledger. In some DLT platforms, modifications to the distributed ledger may be prohibited unless a majority, or some other predefined portion, of the participant nodes consent to the modifications.

In general, a blockchain, such the local blockchains 116, 118 in illustrated in FIG. 1, may include datablocks that are linked according to a cryptography. The arrangement of data blocks and associations between information stored in the data blocks are established by a DLT platform. For example, the blockchain may provide a growing, shared digital data flow, which serves as the source of truth between the participant nodes of the distributed ledger network 112. Depending on the implemented DLT platform, the datablocks of the blockchain may include a genesis datablock that is the initial datablock of the blockchain. Successive datablocks may be appended to the blockchain over time. The blockchain may provide a chronological ledger of information. One or more of the successive datablocks may include a hash of a previous datablock, a hash of a header of the previous datablock, and/or a hash of portions of the previous datablock, depending in the DLT platform. Modifications to one or more datablocks in the blockchain may cause inconsistencies in the hashed information stored in the successive datablocks. The inconsistencies may be detected by the participant nodes of the distributed ledger network 112.

As described herein, a blockchain is referred to as a local instance of a distributed ledger stored on a particular participant node of the distributed ledger network 112. The distributed ledger include multiple blockchains replicated, or partially replicated, across multiple participant nodes of the distributed ledger network 112 and validated based on a shared consensus protocol. Thus, participant nodes, including the development node 102 and the optimization node 108, may include a copy, or partial copy, of a distributed ledger (e.g. local blockchains 116, 118), which, together, form the distributed ledger across all of the participant nodes of the distributed ledger network 112.

A DLT platform may include a blockchain framework. The DLT platform may implement and/or validate the distributed ledger based on consensus among participant nodes of the distributed ledger network 112. The participant nodes may locally implement instances of a DLT platform. For example, the local DLT platforms 114, 118 are local instances of a DLT platform that execute within separate participant nodes of the distributed ledger network 112. In general, a DLT platform may cause the participant nodes to participate in the distributed ledger network 112. For example, the local DLT platform 114 of the development node 102 may communicate with the local DLT platform 118 of the optimization node 108 (and/or other participant nodes) to cause the development node 102 to validate, replicate, and/or synchronize blockchain transactions. Alternatively or in addition, the DLT platform locally implemented by the participant nodes may provide user interfaces, application programming interfaces (APIs), services related to management of the distributed ledger.

Figure 2:
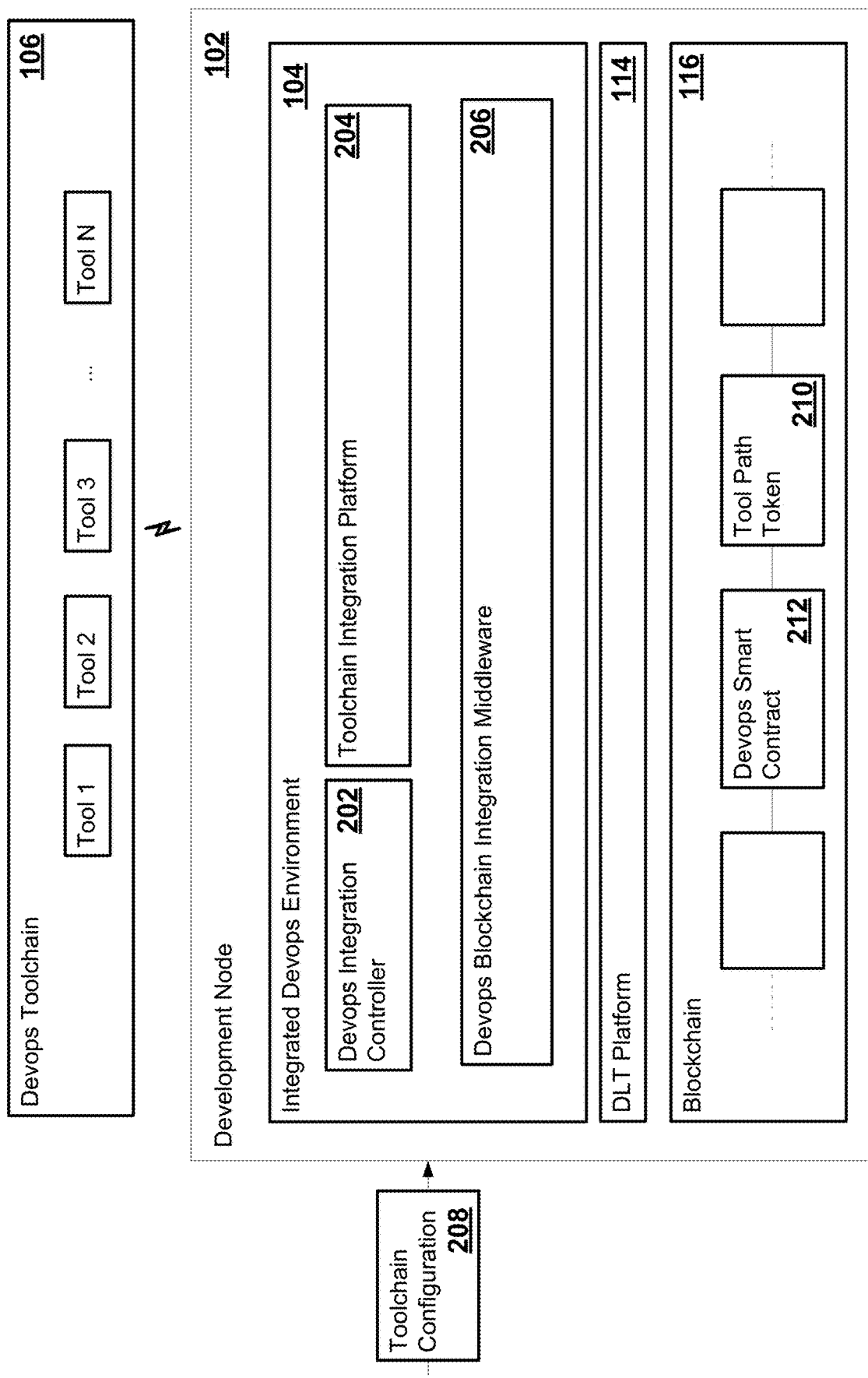
FIG. 2 illustrates an example of a development node for a system.

FIG. 2 illustrates an example of a development node 102 for the system 100. The integrated devops environment 104 may include a devops integration controller 202, a toolchain integration platform 204, and/or a devops blockchain integration (DBI) middleware 206.

Figure 3:
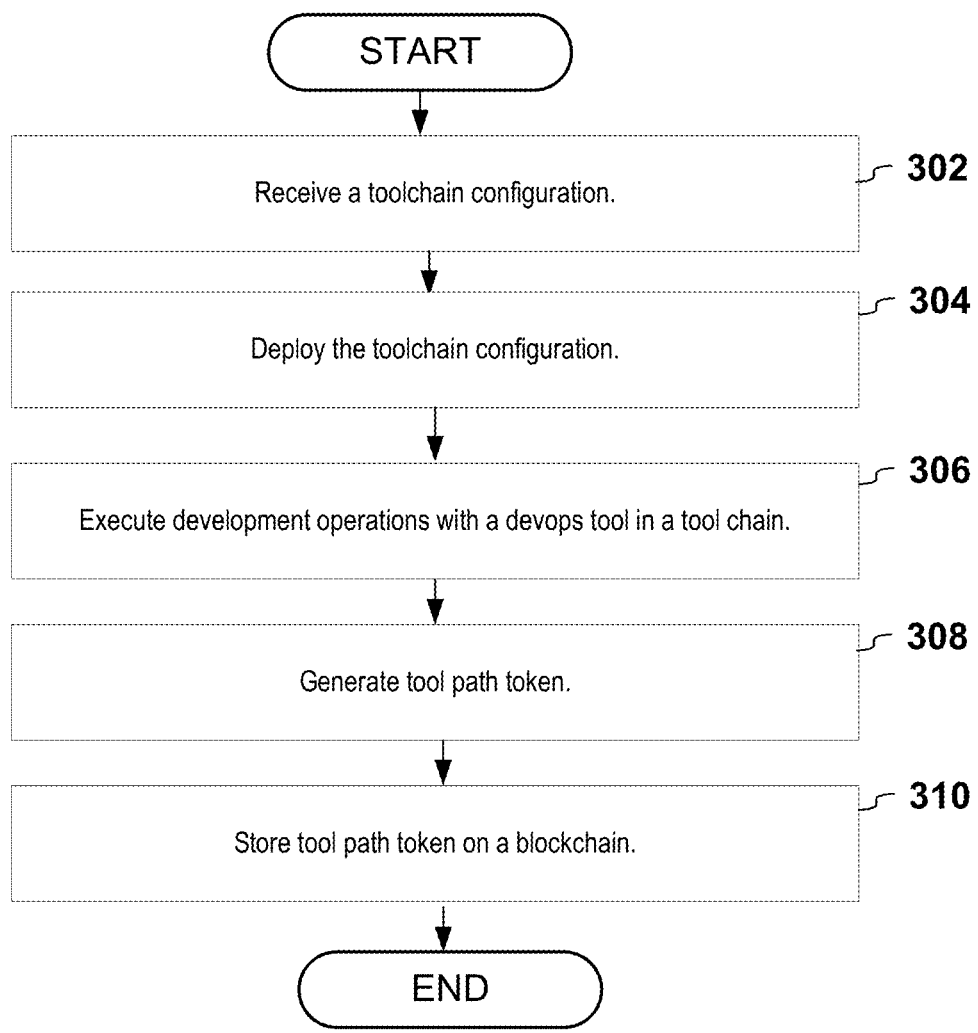
FIG. 3 illustrates a flow diagram for example logic of a development node.

FIG. 3 illustrates a flow diagram for example logic of the development node 102. Reference to FIG. 2 is made throughout the following discussion of FIG. 3.

The devops integration controller 202 may receive a toolchain configuration 208 (302). The toolchain configuration 208 may include a parameters that identify one or more devops tools, actions provided by devops tools (such as procedural calls), object identifiers for data to be passed to the calls, and/or other information that establishes communication with a devops tool or allocated instance of a devops tool. For example, the toolchain configuration may include internet protocol (IP) addresses, credentials, account numbers or other information that establishes communication with an instance of devops tool deployed on premises or in a cloud environment.

The devops integration controller 202 may receive the toolchain configuration 208 from various sources. For example, the devops integration controller 202 may receive one or more parameters of the toolchain configuration via a graphical user interface. Alternatively or in addition, the devops integration controller 202 may generate the graphical use interface with various forms, fields, and controls to receive toolchain configuration parameters. In other examples, the toolchain configuration may arrive from other sources, such as the optimization node 108 (see FIG. 1 and FIG. 4).

The toolchain integration platform 204 may deploy the toolchain configuration 208 (304). For example, the toolchain integration platform 204 may communicate with multiple devops tools to initially configure devops tools based on the toolchain configuration 208. For example, the toolchain integration platform 204 may provision one or more devops tools in response to receipt of the toolchain configuration. Provisioning may involve allocating a devops tool in a cloud environment, downloading a devops tool on premises, configuring the devops tool with various parameters, and/or any other action that causes the devops tool to be allocated and/or deployed for a particular workflow.

The toolchain integration platform 204 may execute development operations with a devops tool in the toolchain 106 (306). The toolchain integration platform 204 may detect one or more user or computer generated events related to a devops process and then execute one or more devops tools based on the event. By way of example, the toolchain integration platform 204 may detect a new source code has been added to a code repository (not shown). The toolchain integration platform 204 may execute a devops tool to perform automated peer review, automated tests, etc. Alternatively or in addition, an operation, such as a scrum master, manager, or other authorized personnel, may initiate interaction with one or more devops tools. The devops tools may be previously configured based on the toolchain configuration 208.

The DBI middleware 206 may generate a tool event token 210 (308). The tool event token 210 may include a token representative of an action performed, or to be performed, by a devops tool. Alternatively or in addition, the tool event token 210 may represent an action executed by a particular devops tool in the devops toolchain 106. For example, the tool event token 210 may include various parameters that identify a devops tool, an action, a development artifact, status information, results information, etc. Table 2 illustrates an example of a data structure for the tool event token 210.

TABLE 2

Tool event token

| Field | Type | Purpose |
| --- | --- | --- |
| SYS_ID_P | Character | Identifier for Preceding System |
| IDO_ID_P | Numeric Character | Identifier for Preceding Action |

TABLE 2-continued

Tool event token

| Field | Type | Purpose |
| --- | --- | --- |
| SYS_ID_S | Character | Identifier for Succeeding System |
| IDO_ID_S | Numeric Character | Identifier for Succeeding Action |
| OBJID | String | Object ID to be affected by the Action |
| DATETIME_S | Date Time stamp | Date-Timestamp of when Action was initiated |
| DATETIME_E | Date Time stamp | Date-Timestamp of when Action was Completed |
| OV_STAT | Character | Overall Status of the Action |
| PARAM | String | Parameters sent to Succeeding System |
| DATA | String | Dataset returned by Succeeding System |
| RETURN | String | Status messages returned by the Succeeding System |

The DBI middleware 206 may communicate with the DLT platform 114 to append the tool event token 210 to the blockchain 116. For example, the DBI middleware 206 may generate the tool event token 210 based in information, such as the parameters shown in Table 2, received from various sources. The DBI middleware 206 may generate time information (i.e. DATETIME_S and DATETIME_E) corresponding to actions executed performed by one or more toolchain.

In some examples, the blockchain may include a devops smart contract 212. The devops smart contract 212 may include a tool event token template. The tool event token template may include a template that specifies the data structure for the tool event token 210. example, the tool event token template may include a schema or other type of specification that specifies a data structure for the tool event token 210. For example, the tool event token template may specify the data structure shown in Table 2. Alternatively or in addition, the tool event token template may specify version information. The version information may include a version of the tool event token template accessed to generate a particular tool event token. Accordingly, participants that access the tool event tokens may identify the appropriate tool event token template to parse the tool event token 210.

In some examples, the devops smart contract 212 may include token generation logic. The token generation logic may include logic to generate one or more tool event tokens. Thus, participants of the DLT network that contribute tool event tokens may access the tool generation logic that is validated by multiple participant nodes of a DLT network. In some examples, the DBI middleware 206 may execute the token generation logic of the devops smart contract 212.

DLT platform 114 may store the tool event token 210 on the blockchain 116. For example, the DBI integration middleware, in response to generation of the tool event token 210, may instruct the DLT platform 114 to append the tool event token 210 to the blockchain. The DLT platform 114 may generate a transaction including the tool event token 210 and submit the transaction to a consensus protocol. In response consensus, the DLT platform 114 may add the transaction to blockchain 116. Other participants of the DLT network, such as the optimization node 108 (FIG. 1), may also obtain the transaction (and thus the tool event token 210) by replicating the transaction in response to the consensus.

Figure 4:
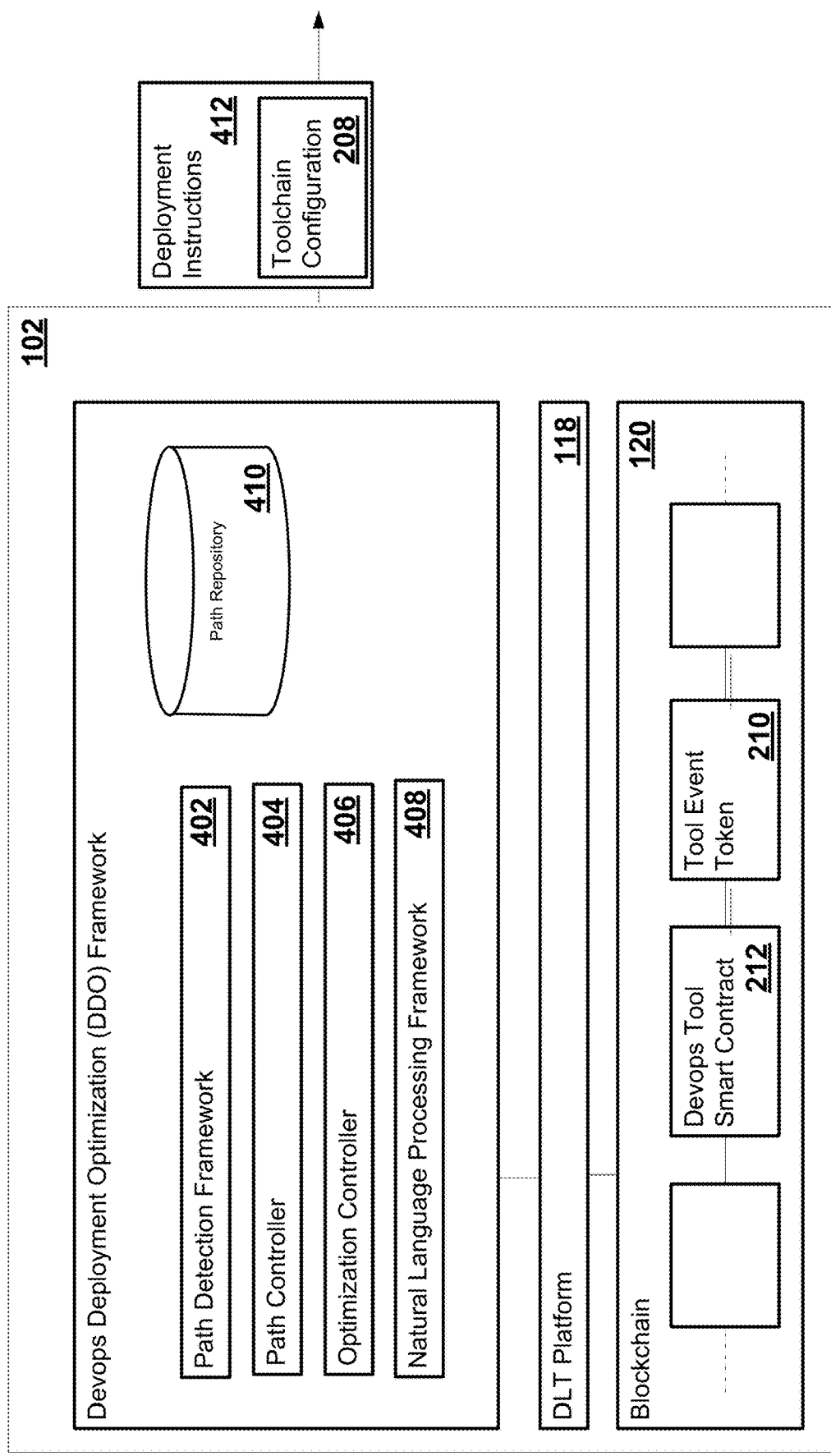
FIG. 4 illustrates an example of an optimization node for a system.

FIG. 4 illustrates an example of the optimization node 108 for the system 100. As illustrated in FIG. 4, the DDO framework 110 of the optimization node 108 may include a path detection framework 402, a path controller 404, an optimization controller 406, a natural language processing (NLP) framework 408, and/or a path repository 410.

Figure 5:
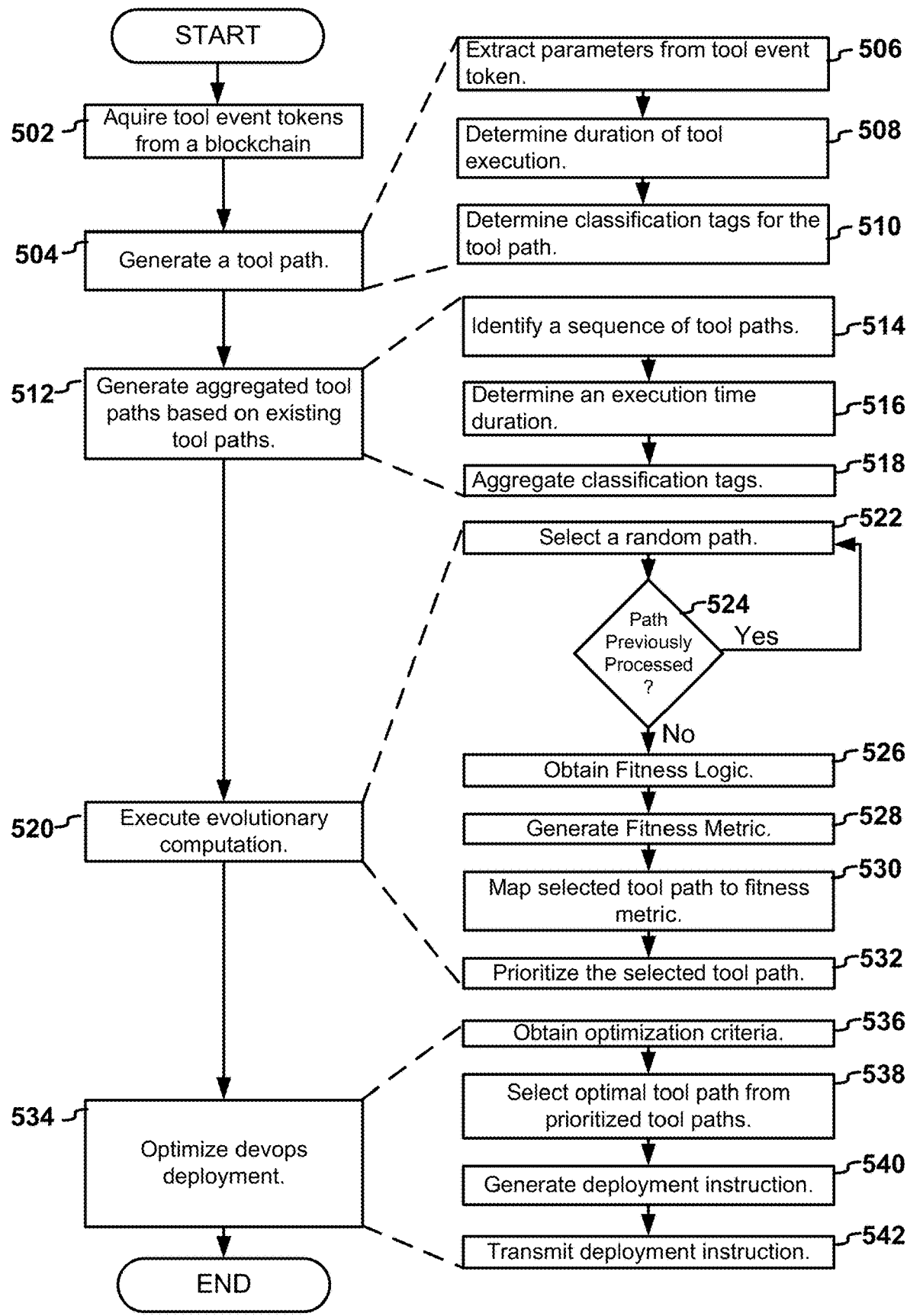
FIG. 5 illustrates a flow diagram for example logic of an optimization node.

FIG. 5 illustrates example logic for the optimization node 108. Reference to FIG. 4 is made throughout the following discussion of FIG. 5. The path detection framework 402 may acquire tool event tokens from the blockchain 120 (502). For example, the DLT platform 118 may store new transaction information on the blockchain 120 in response to the transaction information being validated based on consensus between participants of the distributed ledger network 112 (FIG. 1). The path detection framework 402 may monitor the blockchain for one or more tool event tokens that have not been previously identified.

The path controller 404 may generate a tool path (504). In general, a tool path may include a record representative of a transition between one or more devops tools in a toolchain. The tool path may include information descriptive of the transition between tools and/or execution of devops tool(s). Table 3 illustrates an example of a data structure for the tool path.

TABLE 3

Tool Path

SYS_S IDO_ID_P SYS_E IDO_ID_P OBJID DATETIME_S DATETIME_E PROC_TIME STAT
SYS_S is the identifier for the starting system,
IDO_ID_P is the identifier for the preceding action,
SYS_E is the identifier for the ending system,
IDO_ID_S is the identifier for the succeeding action,
OBJID, DATETIME_S, and DATETIME_E are shown in Table 2, and
PROC_TIME is the difference between DATETIME_E and DATETIME_S.

The tool path may be implemented in a variety of data structures. In various examples, tool paths may be expressed as paths in a graph data structure. For example, the nodes of the graphs may represent particular devops tools and edges may connect the tool nodes. A tool path may include one or more edges between the nodes.

To generate the toolchain path, the path controller 404 may execute, among others, operations 506-510.

The path controller 404 may extract parameters from the tool event token 210 (506). For example, the path controller 404 may identify one or more of the parameters shown in FIG. 1 in the tool event token 210. Alternatively or in addition, the path controller 404 may enrich the information extracted from the tool event token 210 with additional information.

For example, the path controller 404 may determine an execution time (508). The execution time (e.g. PROC_TIME in Table 3) may represent a time duration in which one or more devops tool executed an action or series of actions in a toolchain. Thus, the execution time may include a sum of multiple execution times. Alternatively or in addition, the execution time may include the difference between the start time and end time for execution of a devops tool event (i.e. DATETIME_E–DATETIME_S in Table 3).

The path controller 404 may identify one or more classification tag(s) for the tool path (510). For example, execution of a devops tool may generate runtime information. For example, the runtime information may include information returned from a devops tool in response to a request to perform one or more devops operations. The runtime information may include status information, result information, and/or log information generated during execution of the devops tool. The runtime information may be included in the tool event token 210 (e.g., OV_STAT, DATA, RETURN in Table 2). In some examples, the runtime information may include error information. For example, a devops tool pay generate an error during execution of a devops operation. Alternatively or in addition, the error may indicate that the devops tool is unable to perform an operation.

The path controller may controller 404 may cause natural language processing of the runtime information. The natural langue processing may include sentiment analysis and/or other natural language processing to determine the classification tag(s). For example, the path controller 404 may access a natural language processing model to generate the classification tag(s). The natural language processing model may have been previously trained based on annotated information. The annotated information may annotated runtime information generated by devops tools, which is marked up with labels compatible with the NLP framework 408. The path controller 404 may communicate the natural language processing model and runtime information to the NLP framework 408. The NLP framework 408 may infer one or more classification tag(s) based on the runtime data and model.

A classification tag (e.g. STAT in Table 3) may include a value represents (or identifies) a classification of runtime information generated by one or more devops tools. The classification information may include a classification of runtime information in one or more categories. For example, the classification tag may include an error classification tag (or an identifier thereof). An error classification tag may represent a classification of runtime information that includes error information generated by one or more devops tool.

The path controller 404 may associate (or include) the execution time and the classification tag(s) in the tool path. The path controller 404 may communicate with the path repository 410 to store the tool path. For example, the path controller 404 may store the tool path in the path repository 410. The path repository 410 may include, for example, a database, memory location, and/or other storage. The path repository 410 may store multiple tool paths, which may be traversed based on various criteria.

The DDO framework 110 may generate aggregated tool paths based on existing tool paths (512). An aggregated tool path may represent a transition between multiple devops tools in a toolchain. In some examples, the aggregated tool path may include the same data fields as the existing paths. Alternately or in addition, the aggregated path include additional or alternative data fields. For example, the aggregated tool path may identify multiple tools in the toolchain and/or a sequence in which they were executed. By way of example, the path controller 404 may execute operations 514-516 to generate the aggregated tool path(s).

The path controller 404 may identify a sequence of tool paths (514). For example, the path controller 404 may identify a sequence of previously generated tool paths. The sequence of tool paths may be identified based on the respective starting tool identifiers and ending tool identifiers (e.g., SYS_S and SYS_E in Table 3) of the sequence of tool paths.

By way of example, the ending identifier of a first tool path may be TOOL A and the starting identifier of a second tool may be TOOL B. The path controller 404 may determine the starting identifier of the second tool path corresponds to the ending identifier of the first path. The path controller 404 may generate an aggregated path where the starting identifier is TOOL A and the ending identifier is TOOL B.

The path controller 404 may determine an execution time duration for the aggregated tool path (516). For example, the execution time of the aggregated tool path may include a summation of the execution times of each of the tool path in the sequence of tool paths.

By way of example, an aggregated tool path may be generated based on a first tool path, which has an execution time of 1 hour and a second tool path, which has an execution time of 5 hours. The execution time for the aggregated tool path is 6 hours.

The path controller 404 aggregate the classification tag(s) (518). For example, the path controller 404 may determine at least one of the tool paths in the sequence of tool paths includes a classification tag. The path controller 404 may generate a combined classification tag that includes the classification tag(s) of sequence of classification tags. For example, the path controller 404 may aggregate the classification tags by generating a list, such as a delimited list, of classification tags. Alternatively or in addition, the path controller 404 may determine a frequency of classification tags. For example, the path controller 404 may count a number of occurrences of a classification tag in the sequence of tool paths.

By way of example, an aggregated tool path may be generated based on a first tool path and a second tool path. The first tool path may indicate a "ERROR" classification tag and the second tool path may indicate an "ERROR" classification tag. The aggregated tool path may include a data field that indicates two errors.

The DDO framework 110 may execute evolutionary computation based on a fitness logic (520). The evolutionary computation may determine an optimal tool path based on a fitness logic. The fitness logic may include a logic that measures the how close a solution is to satisfying a set of criteria or goals. For example, the fitness logic may include a fitness function. Table 4 illustrates psuedo-logic for examples of various examples of fitness logic.

TABLE 4

| | Fitness Logic |
|---|---|
| | Identify fastest path |
| F1 | Find the fastest path regardless its error. |
| F2 | Find the path with the fewest errors regardless of execution time |
| F3 | Find the fastest path with fewest errors |
| F4 | Find the fastest path with one or more specified tool. |

To execute the evolutionary computation, the DDO framework 110 may execute, among others, operations 522-532.

For example, the optimization controller 406 may select a tool path (522). The tool path may include, for example, an aggregated path previously discussed. The selected tool path may be randomly selected. Random selection may diversify the sample size of tool paths evaluated and avoid bias in selecting paths for evaluation as well.

The optimization controller 406 may determine whether the tool path has been previously processed (524). For example, the path repository 410 may include mapping between tool paths and fitness logic and/or fitness metrics generated by fitness logic. For example, the repository may include a table, such as Table 5, that stores mappings between tool paths and logic.

TABLE 5

Fitness Mapping

| Tool Path | Fitness Logic | Fitness Metric |
|---|---|---|
| . . . | . . . | . . . |
| P3 | F1 | 90 |
| . . . | . . . | . . . |

The optimization controller 406 may determine that a particular tool path has not been processed (524, path "NO"). For example, the optimization controller 406 may determine that a mapping between a particular tool path and a particular fitness logic does not exist or is out of date. In other words, the optimization controller 406 may determine that a fitness metric does not exist or is out of date for a particular tool path.

In response to determination that the tool path has not been processed (524, path "NO"), the optimization controller 406 may obtain the fitness logic (526). In some examples, the fitness logic may be stored in the path repository 410, or some other storage. Alternatively or in addition, the fitness logic may be generated based on interaction with a graphical user interface.

The optimization controller 406 may generate a fitness metric based on the fitness logic (528). For example, the optimization controller 406 may execute the fitness logic. Execution of the fitness logic process a tool path and compare the tool path to a fitness criteria for the fitness logic. The fitness criteria may include a function or set of operations to generate a fitness metric. The fitness metric may include a measurement of how closely the input parameter(s) satisfy a particular goal or objective of the fitness logic. The fitness metric may include a number on a scoring scale, such as 0 to 100.

The fitness logic may apply various weights, and/or perform various operations on input parameters to determine the fitness metric. The input parameters may include, for example, the execution duration and/or the classification tag(s) of an aggregated path. Alternatively or in addition, the input parameters may include tool identifiers and/or any other information included in a tool path.

The optimization controller 406 may map the selected tool path to the fitness metric (530). For example, the optimization controller 406 may store a mapping between the tool path and the fitness metric in the path repository 410. By way of example, the mapping may be stored in, for example, the data structure shown in Table 5.

The optimization controller 406 may prioritize the selected tool path (532). For example, the optimization controller 406 may sort one or more tool paths based on the fitness metrics respectively mapped to tool paths. In some examples, the optimization controller 406 may generate one or more prioritized tool paths for sets of fitness logic, respectively. For example, each of the sets of fitness logic may be associated with respective fitness identifiers. Each of the fitness logic may be mapped to a prioritization of tool path(s) previously generated based on the evolutionary computation.

The DDO framework 110 may optimize devops deployments (534). For example, the mappings between fitness identifiers and prioritized tool paths may enable selection of the top ranking tool paths in for each of the fitness identifiers. Thus, the top ranking tool paths may correspond to an optimal combination of devops tools for a toolchain. To optimize the devops deployment, the DDO framework 110 may execute operations 536-542.

For example, the optimization controller 406 may receive an optimization criteria (536). The optimization criteria may include one or more fitness identifiers. In some examples, the optimization controller 406 may receive the optimization criteria via one or more graphical user interface. For example, a user may select the optimization criteria (or a GUI label representative of the fitness identifier).

The DDO framework 110 may select an optimal tool path from the prioritized tool paths (538). For example, the DDO framework 110 may query the path repository 410 to obtain the prioritized tool path(s) associated with a fitness identifier specified in the optimization criteria.

The optimization criteria may one or more rules for selecting the optimal path. For example, the optimization criteria may include a fitness identifier. The DDO framework 110 may extract the fitness identifier from the optimization criteria. The DDO framework may one or more prioritized tool paths associated with the fitness identifier. The DDO framework 110 may select the tool path mapped to a highest fitness metric for the specified fitness identifier. In other examples, the optimization criteria may include an acceptance threshold, such as 10%. The DDO Framework 110 may select the top 10% of the prioritized tool paths.

In some examples, the optimization criteria may specify one or more constraint parameters. For example, the constraint parameter may include one or more devops tool identifier that is desired to be in the identified optimal path. The DDO Framework 110 may filter the tool paths to remove tool paths that do not include the one or more specified tool identifiers. Then, the DDO framework may select the optimized tool path(s) from the filtered tool paths based on the optimization criteria.

The DDO framework 110 may generate a deployment instruction 412 based on the optimal tool path(s) (540). The deployment instruction may include the toolchain configuration 208. In various examples, the deployment instruction 412 may include a machine executable instruction to deploy the toolchain configuration 208 and/or display instructions to display a recommendation to deploy the toolchain configuration. For example, the deployment instruction may cause the development node 102, or other computer systems with an integrated devops environment, to configure and/or deploy a toolchain corresponding to the optimized tool path.

In some examples, the DDO framework may generate a graphical user interface, which allows users to view the toolchain configuration 208 and/or an optimized tool path. The graphical user interface may further include controls for receiving a deployment request. The deployment request may cause the DDO framework to communicate the deployment instruction and/or toolchain configuration 208 to a designated target, such as the development node 102 (FIGS. 1-3).

The DDO Framework may transmit the deployment instruction 412 (542). For example, the DDO framework may transmit the deployment instruction to one or more development node, integrated devops environment, and/or computer system in communication with the integrated devops environment.

Figure 6:
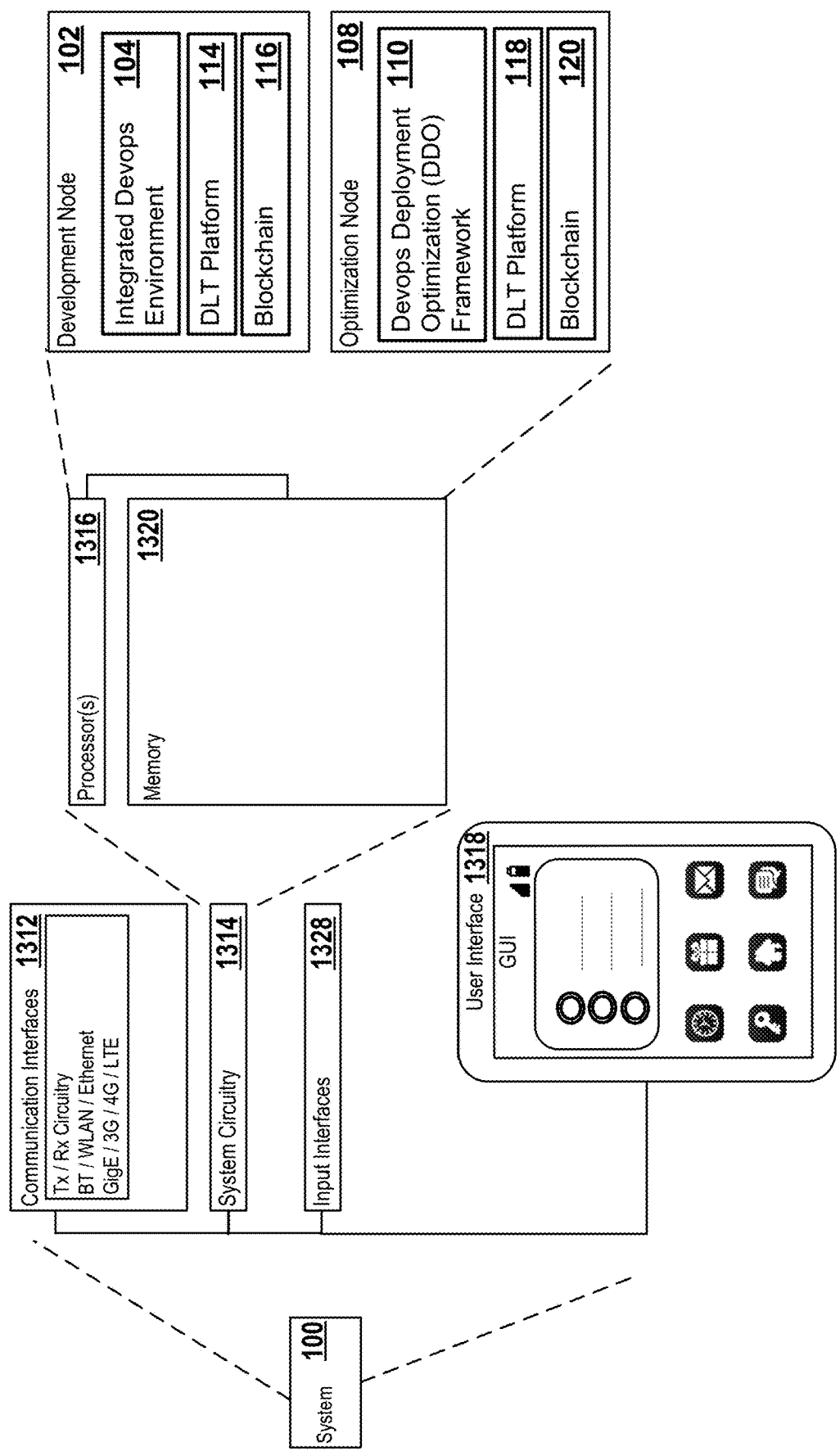
FIG. 6 illustrates a second example of a system.

FIG. 6 illustrates a second example of the system 100. The system 100 may include communication interfaces 1312, input interfaces 1328 and/or system circuitry 1314. The system circuitry 1314 may include a processor 1316 or multiple processors. Alternatively or in addition, the system circuitry 1314 may include memory 1320.

The processor 1316 may be in communication with the memory 1320. In some examples, the processor 1316 may also be in communication with additional elements, such as the communication interfaces 1312, the input interfaces 1328, and/or the user interface 1318. Examples of the processor 1316 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 1316 may be one or more devices operable to execute logic. The logic may include computer executable instructions or computer code stored in the memory 1320 or in other memory that when executed by the processor 1316, cause the processor 1316 to perform the operations of the development node 102, the integrated devops environment 104, the DLT platform 114, the local blockchain of the development node 102, the optimization node 108, the DDO framework 110, the DLT platform 118, the local blockchain 120 of the optimization node 108, the system 100, and/or other logic described herein. The computer code may include instructions executable with the processor 1316.

The memory 1320 may be any device for storing and retrieving data or any combination thereof. The memory 1320 may include non-volatile and/or volatile memory, such as a random access memory (RAM), a read-only memory (ROM), an erasable programmable read-only memory (EPROM), or flash memory. Alternatively or in addition, the memory 1320 may include an optical, magnetic (harddrive), solid-state drive or any other form of data storage device. The memory 1320 may include at least one of the development node 102, the integrated devops environment 104, the DLT platform 114, the local blockchain of the development node 102, the optimization node 108, the DDO framework 110, the DLT platform 118, the local blockchain 120 of the optimization node 108, and/or the system 100. Alternatively or in addition, the memory may include any other component or sub-component of the system 100 described herein.

The user interface 1318 may include any interface for displaying graphical information. The system circuitry 1314 and/or the communications interface(s) 1312 may communicate signals or commands to the user interface 1318 that cause the user interface to display graphical information. Alternatively or in addition, the user interface 1318 may be remote to the system 100 and the system circuitry 1314 and/or communication interface(s) may communicate instructions, such as HTML, to the user interface to cause the user interface to display, compile, and/or render information content. In some examples, the content displayed by the user interface 1318 may be interactive or responsive to user input. For example, the user interface 1318 may communicate signals, messages, and/or information back to the communications interface 1312 or system circuitry 1314.

The system 100 may be implemented in many different ways. In some examples, the system 100 may be implemented with one or more logical components. For example, the logical components of the system 100 may be hardware or a combination of hardware and software. The logical components may include the development node 102, the integrated devops environment 104, the DLT platform 114, the local blockchain of the development node 102, the optimization node 108, the DDO framework 110, the DLT platform 118, the local blockchain 120 of the optimization node 108, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 1320, for example, that comprises instructions executable with the processor 1316 or other processor to implement one or more of the features of the logical components. When any one of the logical components includes the portion of the memory that comprises instructions executable with the processor 1316, the component may or may not include the processor 1316. In some examples, each logical component may just be the portion of the memory 1320 or other physical memory that comprises instructions executable with the processor 1316, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements, which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
    detecting, by a first participant node of a distributed ledger network, a tool event token stored on a blockchain, the tool event token generated by a second participant node of the distributed ledger network, the tool event token representative of execution of a devops tool in a toolchain for an integrated devops environment, the tool event token comprising runtime information generated by the devops tool;
    generating, in response to detection of the tool event token, a new tool path, the new tool path comprising a starting tool identifier, an ending tool identifier, and an execution time duration, the starting tool identifier corresponding to a preceding devops tool and the ending tool identifier corresponding to a subsequent devops tool in the toolchain, wherein generating the new tool path comprises:
        accessing a natural language processing model previously trained based on annotated runtime information;
        determining a classification tag based on the natural language processing model and the runtime information; and
        including the classification tag in the new tool path;
    aggregating the new tool path with a previously generated tool path by:
        identifying a sequence of tool paths based on respective starting tool identifiers and respective ending tool identifiers of the tool paths, the sequence of tool paths comprising the new path and the previously generated tool path,
        determining a total execution time based on a combination of the respective execution time durations of the sequence of tool paths, and
        generating an aggregated tool path comprising the total execution time;
    storing the aggregated tool path in a repository;
    executing a fitness logic to generate a fitness metric based the aggregated tool path;
    store, in the repository, a mapping between the fitness metric and the aggregated tool path;
    accessing a plurality of unique tool paths from the repository that are mapped to respective fitness metrics previously generated based on the fitness logic;
    prioritizing the unique tool paths based on the respective fitness metrics;
    selecting an optimal tool path based on the prioritized unique tool paths; and
    communicating a devops deployment instruction, the devops deployment instruction comprising an instruction to configure an integrated devops environment to communicate with devops tools identified in the optimal tool path.

2. The method of claim 1, wherein aggregating the new tool path with the previously generated tool path further comprises:

extracting the classification tag from at least one of the tools paths in the sequence of tool paths;

determining a frequency of the classification tag in the sequence of tool paths; and including the frequency in the aggregated tool path.

3. The method of claim 2, executing the fitness logic to generate the fitness metric based on the aggregated path further comprises:

generating the fitness metric based on the frequency of the classification tag and the total execution time.

4. The method of claim 3, wherein the classification tag is indicative of the runtime information including error information.

5. The method of claim 1, wherein selecting the optimal tool path based on the prioritized unique tool paths further comprises:

receiving a optimization criteria comprising a selected tool identifier;

filtering the tool paths to include only a subset of tool paths that include the selected tool path identifier; and selecting, from the filtered tool paths, a highest prioritized tool path based on the fitness metric.

6. The method of claim 1 wherein accessing the plurality of unique tool paths from the repository that are mapped to respective fitness metrics previously generated based on the fitness logic further comprises:

receiving a optimization criteria comprising a fitness identifier associated with the fitness logic;

extracting the fitness identifier form the optimization criteria; and selecting the prioritized tool paths from the repository in response to the prioritized tool paths being mapped to the fitness identifier.

7. The method of claim 1, wherein the devops deployment instruction includes an instruction to cause the second participant node to provision a new toolchain with devops tools corresponding to tool identifiers included in the optimal tool path.

8. A participant node of a distributed ledger network comprising multiple participant nodes, the participant node comprising:

a memory configured to store a blockchain;

a processor, the processor configured to:

detect a tool event token stored on the blockchain, the tool event token generated by another participant node of the distributed ledger network, the tool event token representative of execution of a devops tool in a toolchain for an integrated devops environment, the tool event token comprising runtime information generated by the devops tool;

generate, in response to detection of the tool event token, a new tool path, the new tool path comprising a starting tool identifier, an ending tool identifier, and an execution time duration, the starting tool identifier corresponding to a preceding devops tool and the ending tool identifier corresponding to a subsequent devops tool in the toolchain, wherein to generate the new tool path, the processor is further configured to:

access a natural language processing model previously trained based on annotated runtime information;

determine a classification tag based on the natural language processing model and the runtime information; and include the classification tag in the new tool path;

aggregate the new tool path with a previously generated tool path based on:

identification of a sequence of tool paths based on respective starting tool identifiers and respective ending tool identifiers of the tool paths, the sequence of tool paths comprising the new path and the previously generated tool path, and determination of a total execution time based on a combination of the respective execution time durations of the sequence of tool paths;

execute a fitness logic to generate a fitness metric based the aggregated tool path;

store, in the repository, a mapping between the fitness metric and the aggregated tool path;

access a plurality of unique tool paths from the repository that are mapped to respective fitness metrics previously generated based on the fitness logic;

prioritize the unique tool paths based on the respective fitness metrics;

select an optimal tool path based on the prioritized unique tool paths; and communicate a devops deployment instruction, the devops deployment instruction comprising an instruction to configure an integrated devops environment to communicate with devops tools identified in the optimal tool path.

9. The system of claim 8, wherein to aggregate the new tool path with the previously generated tool path, the processor is further configured to:

extract the classification tag from at least one of the tools paths in the sequence of tool paths;

determine a frequency of the classification tag in the sequence of tool paths; and include the frequency in the aggregated tool path.

10. The system of claim 8, where to execute the fitness logic to generate the fitness metric based on the aggregated path, the processor is further configured to:

generate the fitness metric based on the frequency of the classification tag and the total execution time.

11. The system of claim 10, wherein the classification tag is indicative of the runtime information including error information.

12. The system of claim 8, wherein to select the optimal tool path based on the prioritized unique tool paths, the processor is further configured to:

receive a optimization criteria comprising a selected tool identifier;

filter the tool paths to include only a subset of tool paths that include the selected tool path identifier; and select, from the filtered tool paths, a highest prioritized tool path based on the fitness metric.

13. The system of claim 8, wherein the devops deployment instruction includes an instruction to cause the other participant node to provision a new toolchain with devops tools corresponding to tool identifiers included in the optimal tool path.

14. A non-transitory computer readable storage medium comprising:

a plurality of instructions executable by a processor, the instructions comprising:

instructions executable by the processor to detect a tool event token stored on a blockchain stored by a first participant node of a distributed ledger network, the tool event token generated by a second participant node of the distributed ledger network, the tool event token representative of execution of a devops tool in a toolchain for an integrated devops environment, the tool event token comprising runtime information generated by the devops tool;

instructions executable by the processor to generate, in response to detection of the tool event token, a new tool path, the new tool path comprising a starting tool identifier, an ending tool identifier, and an execution time duration, the starting tool identifier corresponding to a preceding devops tool and the ending tool identifier corresponding to a subsequent devops tool in the toolchain, wherein the instructions executable by the processor to generate the new tool path further comprise:
  instructions executable by the processor to access a natural language processing model previously trained based on annotated runtime information;
  instructions executable by the processor to determine a classification tag based on the natural language processing model and the runtime information; and
  instructions executable by the processor to include the classification tag in the new tool path;
instructions executable by the processor to aggregate the new tool path with a previously generated tool path based on:
  identification of a sequence of tool paths based on respective starting tool identifiers and respective ending tool identifiers of the tool paths, the sequence of tool paths comprising the new path and the previously generated tool path, and
  determination of a total execution time based on a combination of the respective execution time durations of the sequence of tool paths;
instructions executable by the processor to execute a fitness logic to generate a fitness metric based the aggregated tool path;
instructions executable by the processor to store, in the repository, a mapping between the fitness metric and the aggregated tool path;
instructions executable by the processor to access a plurality of unique tool paths from the repository that are mapped to respective fitness metrics previously generated based on the fitness logic;
instructions executable by the processor to prioritize the unique tool paths based on the respective fitness metrics;
instructions executable by the processor to select an optimal tool path based on the prioritized unique tool paths; and
instructions executable by the processor to communicate a devops deployment instruction, the devops deployment instruction comprising an instruction to configure an integrated devops environment to communicate with devops tools identified in the optimal tool path.

15. The non-transitory computer readable storage medium of claim 14,
  wherein the instructions executable by the processor to aggregate the new tool path with the previously generated tool path further comprise:
    instructions executable by the processor to extract the classification tag from at least one of the tools paths in the sequence of tool paths;
    instructions executable by the processor to determine a frequency of the classification tag in the sequence of tool paths; and
    instructions executable by the processor to include the frequency in the aggregated tool path.

16. The non-transitory computer readable storage medium of claim 15, wherein the classification tag is indicative of the runtime information including error information.

17. The non-transitory computer readable storage medium of claim 14, wherein the instructions executable by the processor to select the optimal tool path based on the prioritized unique tool paths further comprise:
  instructions executable by the processor to receive a optimization criteria comprising a selected tool identifier;
  instructions executable by the processor to filter the tool paths to include only a subset of tool paths that include the selected tool path identifier; and
  instructions executable by the processor to select, from the filtered tool paths, a highest prioritized tool path that based on the fitness metric.

18. The non-transitory computer readable storage medium of claim 14, wherein the devops deployment instruction includes an instruction to cause the second participant node to provision a new toolchain with devops tools corresponding to tool identifiers included in the optimal tool path.

* * * * *